US005555448A

United States Patent [19]
Thiede et al.

[11] Patent Number: 5,555,448
[45] Date of Patent: Sep. 10, 1996

[54] COMBINED WIRELESS/WIRED PHONE HANDSET SYSTEM

[75] Inventors: Paul W. Thiede, Sharpsville; Karl D. Vandivier, Kokomo, both of Ind.

[73] Assignee: Delco Electronics Corporation, Kokomo, Ind.

[21] Appl. No.: 395,227

[22] Filed: Feb. 27, 1995

[51] Int. Cl.⁶ .................................................. H04B 1/38
[52] U.S. Cl. ............................ 455/89; 455/90; 455/128; 455/346; 455/351; 379/58
[58] Field of Search ............................. 455/89, 90, 127, 455/128, 345, 346, 348, 349, 351; 379/420, 434, 435, 58, 61

[56] References Cited

U.S. PATENT DOCUMENTS

| 5,142,573 | 8/1992 | Umezawa | 455/89 |
| 5,189,358 | 2/1993 | Tomura et al. | 455/89 |

FOREIGN PATENT DOCUMENTS 6-132869  5/1994  Japan ........................ 455/90

OTHER PUBLICATIONS

Hello Direct Sales Brochure, "Universal Car Kit for Portable Cellular Telephones", Copyright 1994, Hello Direct.

Primary Examiner—Chi H. Pham
Attorney, Agent, or Firm—Jimmy L. Funke

[57] ABSTRACT

A portable phone comprises a handset having a low power radio transmitter and a base station having a booster transmitter that is optionally coupled to the handset for better transmission. A docking cradle has a nest to receive a boat and the boat has a pocket to receive the handset. The boat is connected to the base by a cord and a connector in the boat is coupled to the handset when the handset is seated in the boat. The cradle, boat and handset are nested together for compact hands-free operation, the handset is removed from the boat for portable operation, or the handset and boat together are removed from the cradle for wire-connected hand-held operation.

9 Claims, 3 Drawing Sheets

COMBINED WIRELESS/WIRED PHONE HANDSET SYSTEM

FIELD OF THE INVENTION

This invention relates to mobile telephones, i.e. wireless telephony, and particularly to an integrated handset and cradle assembly for use in portable, wired-connected hand-held and hands-free modes.

BACKGROUND OF THE INVENTION

In the field of cellular or other types of mobile telephones, it is known to use the handset in a portable mode with no cord attached to communicate directly with a remote radio antenna, and to optionally plug the handset to a cord leading to a base for communication via the base. The handset is typically able to transmit at a power of 0.6 watt, whereas the base is capable of transmitting at 3 watts for clearer and more reliable communication. Thus it is desirable to change from portable mode to a wire-connected mode whenever the portability is not necessary. It is awkward and inconvenient, however, to plug a cord into the handset while operating a vehicle.

When the cord is attached to the handset, the telephone may be used in a hand-held mode, employing an earpiece and a microphone in the handset, or it may be used in a hands-free mode where the handset rests on the cradle which is coupled via a base to an external speaker and microphone for audio communication.

Often the telephones provided for use in vehicles comprise a cradle which may not be cosmetically and/or safely secured in the vehicle and a handset which loosely rests on the cradle. A cord coupling the two parts hangs loose and poses a management problem, and the difficulty in converting to and from a portable mode remains. It is known for airline telephone service to include a cord storage facility and a handset storage location in a cradle, which is attached to a seat back, and a push button release for separating the handset from the cradle, although the handset is permanently attached to the cord and there is no portable mode.

Another proposed telephone configuration employs a cradle having a cord which plugs into an adapter which loosely seats on the cradle, and a handset which, in turn, plugs into the adapter.

SUMMARY OF THE INVENTION

It is therefore an object of the invention to convert between a portable and a wire-connected handset mode without handling a cord. Another object is to combine the components of a portable/wired telephone into a secure integrated package with controlled release for portable and wired hand-held modes.

A mobile telephone consists of a base, a cradle, a boat connected by a cord through the cradle to the base and fitting snugly in the cradle, and a handset for seating in the boat and coupled to the cord when so seated for wired connection to the base. The boat has terminals connected to the cord for coupling to the handset when the handset is in the boat. The cradle includes a reel or other storage capability for managing the cord and keeping it contained when the boat is stowed in the cradle. The handset is removable from the boat for operation in a portable mode. The handset has circuitry for radio communication directly from its antenna to a remote antenna in a telephone system when in a portable mode, and then is independent of the base. Since the handset is powered by a small battery, its transmission power is limited to 0.6 watt. The base has a 3 watt booster and its own antenna, so that when the handset is wire connected to the base the transmission is sent from the base with 3 watts of power. A sensor determines when the handset is so connected and activates the appropriate antenna.

The pocket of the boat is deep to securely receive the handset and conforms closely to the handset. The boat adds little bulk to the handset so that they are easily held together for hand-held wire-connected mode. A latch on the boat holds the handset is seated in the pocket and a push button release ejects the handset from the boat for portable operation.

The cradle is deep to fully receive the boat and is shaped to conform to the outer configuration of the boat for secure containment. A latch on the cradle holds the boat in the cradle and a push button release ejects the boat/handset combination for hand-held operation. The cradle contains or is connected via the base to a speaker and microphone for use in hands-free operation. A sensor actuated when the handset and boat are nested in the cradle enables those audio transducers for the hands-free mode, and enables corresponding audio transducers in the handset when the handset is removed from the cradle.

The three components are nested together in a compact integrated package which is easily embedded in an arm rest or other vehicle receptacle where the package is securely held and convenient for use. The integrated package is easy to supply to a vehicle assembly facility and to install as a unit, in contrast to the difficulty in bringing together separate components which are married at the assembly point.

In use, when all three components are nested together, the package is in the hands-free mode so that the phone can be used without removing the handset. When portable use is desired, the handset is released from the package by pressing a push button. The handset will then pop out of the boat and disconnect from the cord. The portable use is ended by simply pushing the handset back into the boat. When hand-held, wire-connected mode is desired, the handset and boat are released as a unit from the cradle by pressing another push button. The boat/handset will pop out of the cradle and the cord will be payed out of its storage area. To end that usage, the boat/handset combination is returned to the cradle and the cord is rewound.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a cellular telephone for portable use and use within a motor vehicle, but it will be appreciated that the invention is not limited to that application but is adaptable to other telephone applications where both portable and wire-connected handset use are desired.

Figure 1:
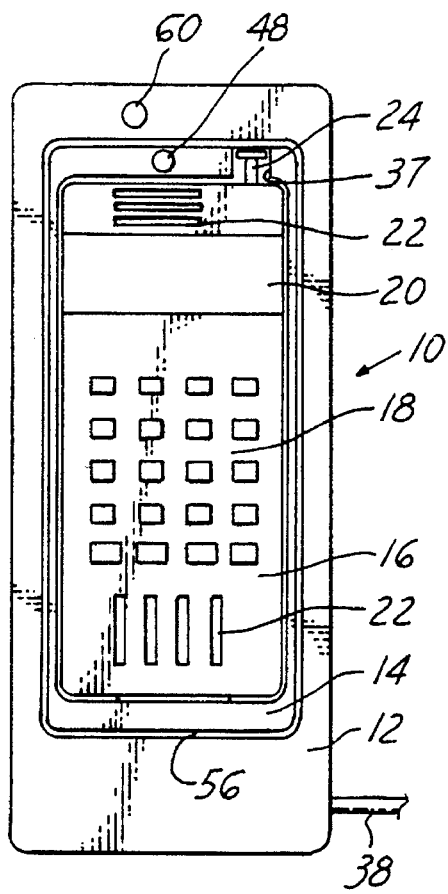
FIG. 1 is a plan view of a telephone handset, boat, and cradle assembly for portable use and wire-connected use according to the invention.
Figure 2:
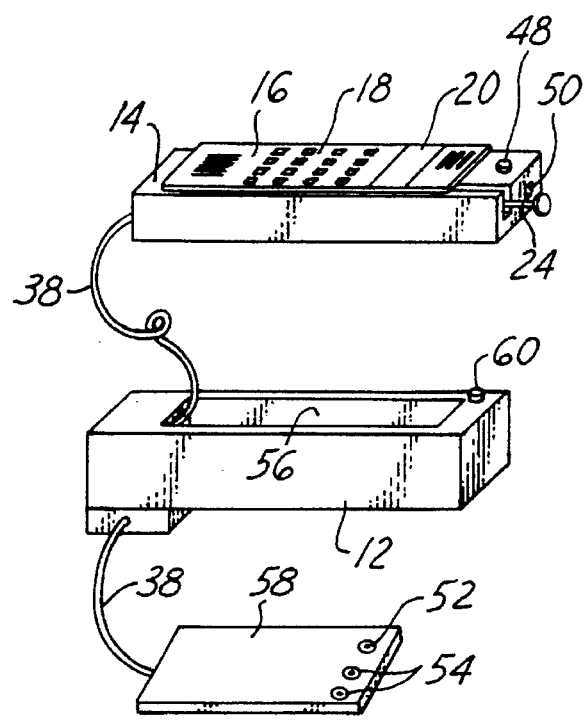
FIG. 2 is an isometric view of the telephone assembly of FIG. 1 with the handset removed from the cradle for wire-connected use.

Referring to FIG. 1, an integrated mobile telephone 10 suitable for installation in a recess in a vehicle, such as in an armrest, is comprised of three separable components: a cradle 12, a boat 14, and a handset 16. The three components nest together and are locked together to comprise a unitary package for standby operation and for hands-free operation. The handset 16 is removable from the package for portable use, and the boat 14 and handset 16 are removable together, as shown in FIG. 2, for wired use for hand-held operation.

The handset 16 is a complete cellular telephone powered by a small battery and including a 0.6 watt transmitter for communication with a remote system antenna. The handset includes a keypad 18, a display 20, apertures 22 for an earpiece and a microphone, and an antenna 24 extendable from one end. A female connector receptacle 25 on an end of the handset opposite the antenna couples with a mating connector on the boat 14.

Figure 3:
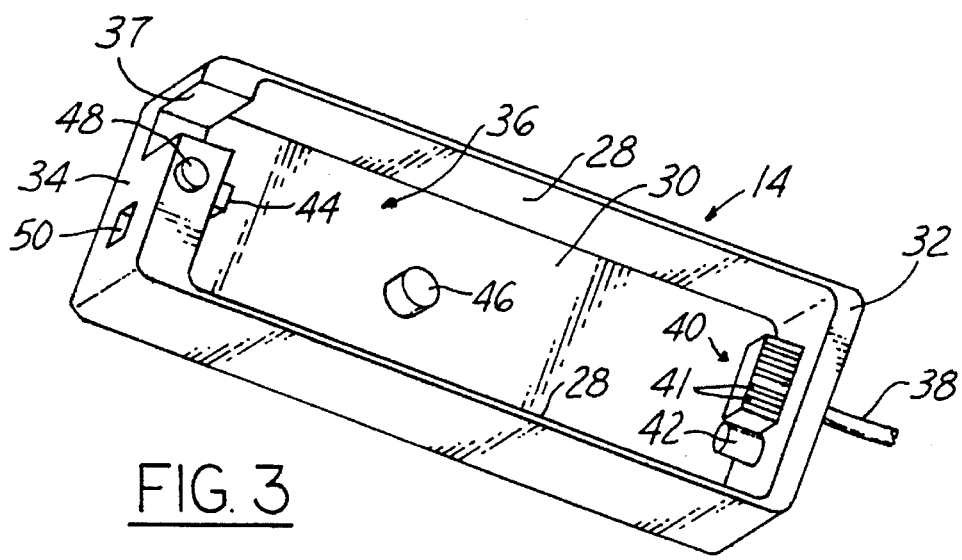
FIG. 3 is an isometric view of a boat which is part of the assembly of FIG. 1.

The boat 14, shown also in FIG. 3, is a molded plastic shell with thin side walls 28 and bottom 30, and thicker first and second ends 32 and 34. The boat defines a deep pocket 36 configured for snugly receiving the handset 16. A recess 37 in the end 34 accommodates the antenna 24. A cord 38 is attached to the boat and has a male connector 40 with contact terminals 41 and a coaxial adapter 42 molded into the first end 32 extending into the pocket 36 for coupling to the receptacle 25 on the handset 16, thereby accommodating both audio and rf signals. The latch includes a spring-biased bolt 44 slidable in the second end 34 for engaging a latching recess 45 in the end of the handset 16 adjacent the antenna 24. A release mechanism includes a spring-biased button 46 in the bottom 30 which pushes against the handset for ejection, and a release push button 48 on the upper surface of the end 34 for retracting the bolt 44 from the recess in the handset. When the push button 48 is pressed, the bolt moves back to release the handset which is pushed from the boat by the button 46 to allow gripping the handset by hand. Replacement of the handset requires only that the handset be pushed into the boat against the spring-biased button 46 and the bolt 44 will snap into the recess 45. The boat also includes in the outer surface of the end 34, a latching recess 50 for retaining the boat in the cradle 12.

Figure 4:
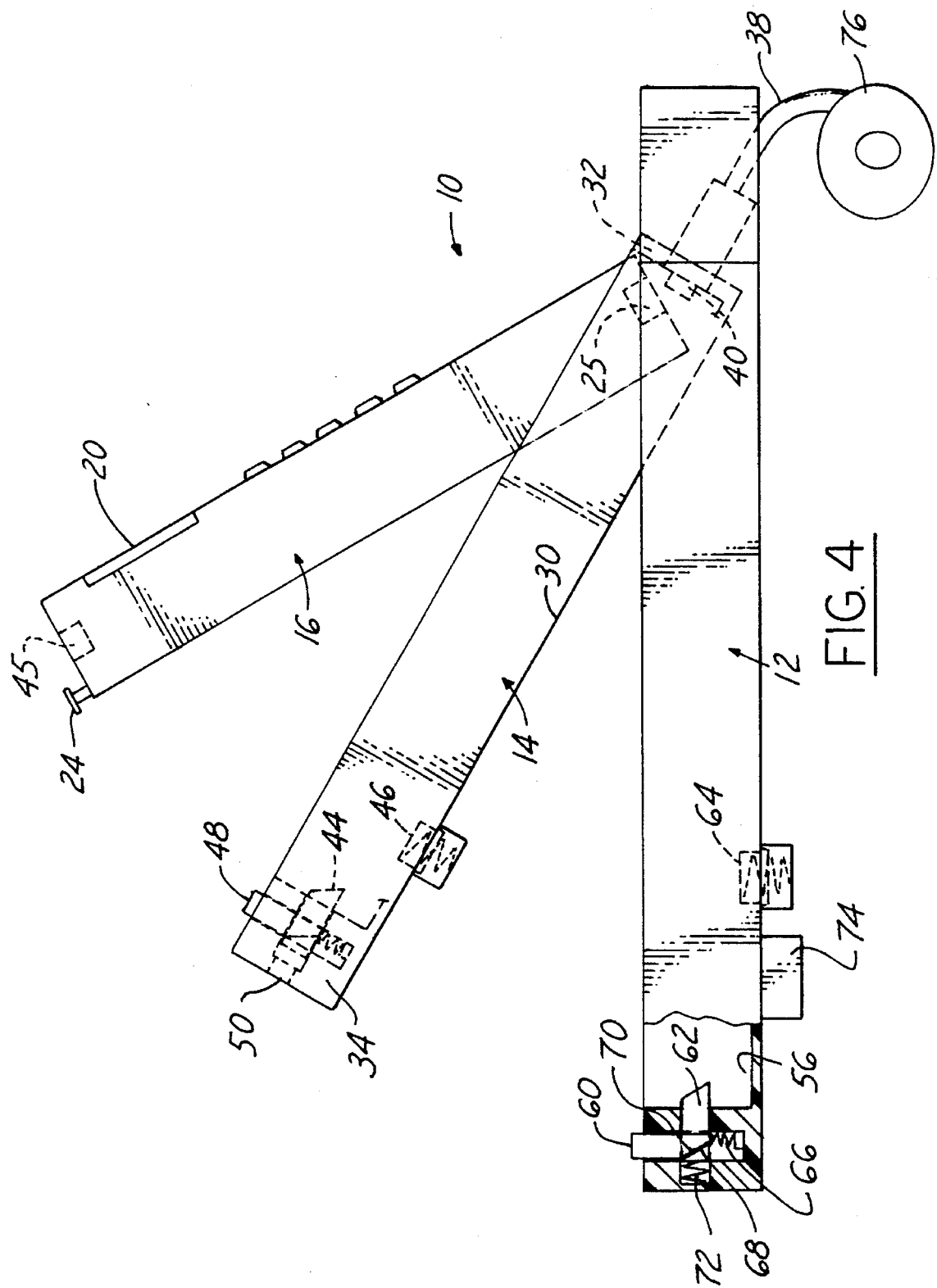
FIG. 4 is a side view of the telephone of FIG. 1 with the components in stages of separation.
Figure 5:
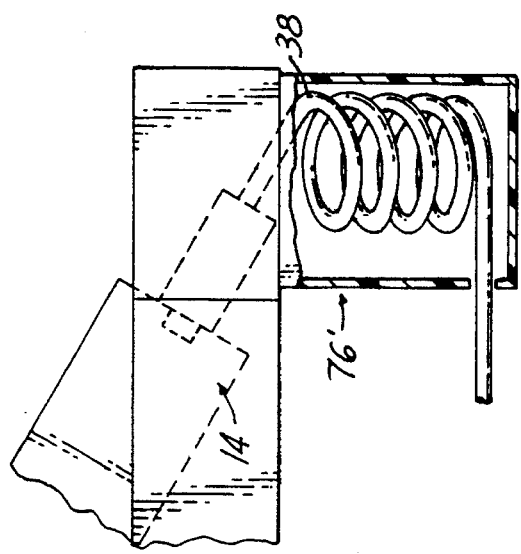
FIG. 5 is a partially sectioned view of a portion of the telephone showing a cord storage arrangement.

The base 58 includes a 3 watt booster for signal transmission and a connection 52 to an external antenna so that when the handset is connected by the cord 38 to the base, a more powerful transmission is possible. Other connections 54 to a speaker and a microphone adapt the unit for hands-free operation. A deep pocket 56 in the cradle 12 receives and conforms to the boat 14. As best shown in FIG. 4, which shows the boat 14 when partially removed from the cradle 12 and the handset 16 partially removed from the boat, the cradle includes a latch and release mechanism like that of the boat. A release push button 60 operates a sliding bolt 62 which enters the end of the cradle pocket 56 to engage the recess 50 in the boat, and a spring-biased button 64 like the button 46 of the boat pushes on the bottom of the boat for ejection. The bolt 62 has a ramped nose for automatic retraction when the boat is pushed into the cradle. The push button 60 is biased upwardly by a spring 66, and a ramped cam surface 68 on the button 60 engages a follower 70 on the bolt 62 to retract the bolt when the button 60 is pressed. A spring 72 urges the bolt outward. A well 74 in the bottom of the cradle receives the spring-biased button 46 mechanism which protrudes from the bottom of the boat 14. A self-winding reel 76 for paying out and retracting the cord 38 is included at one end of the cradle. Alternately, as shown in FIG. 5, the cord 38 may be a self-coiling cord which stores in a well 76 when tension is released from the cord.

Figure 6:
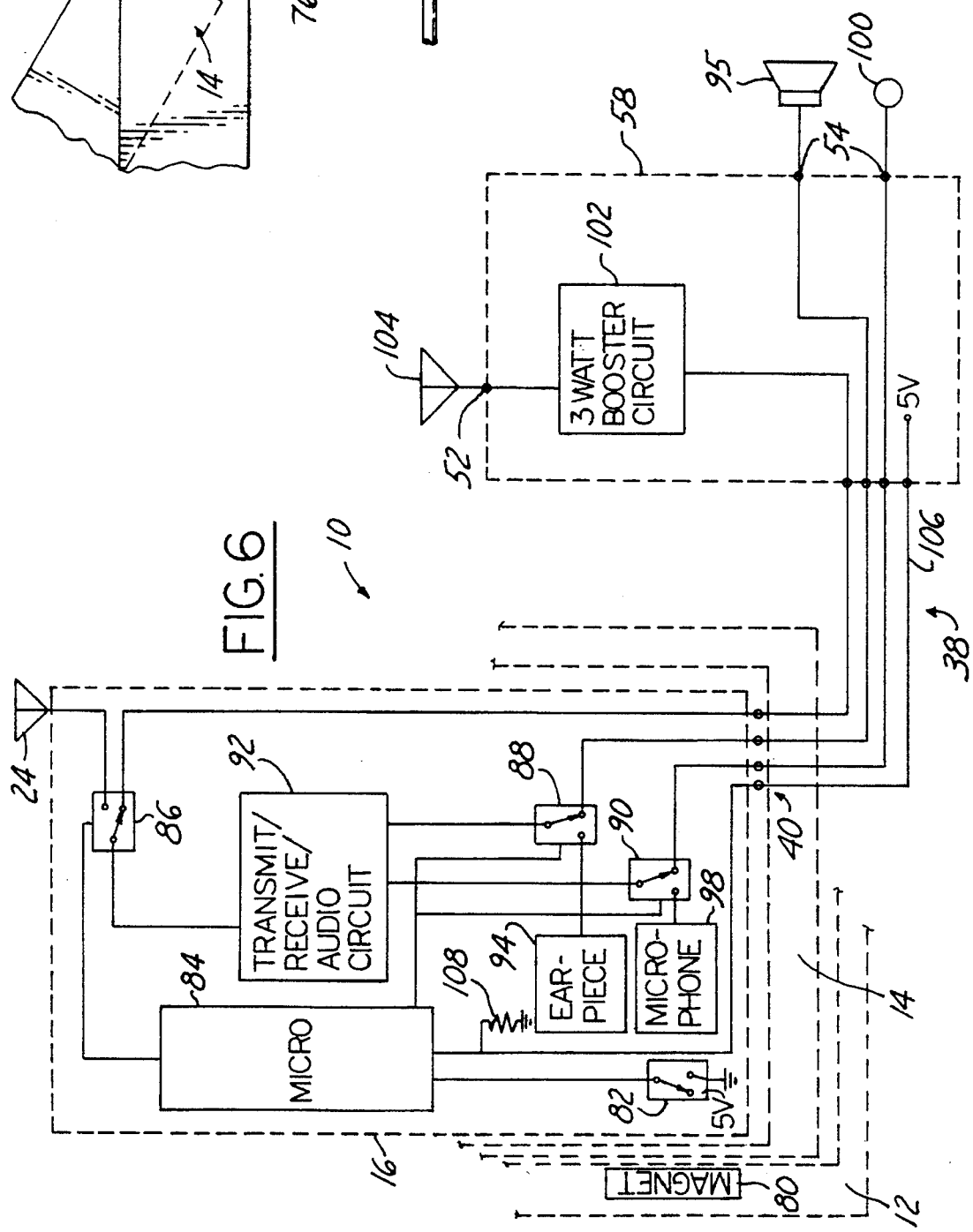
FIG. 6 is a circuit diagram of the telephone of FIG. 1, according to the invention.

The circuit of the integrated telephone is shown in FIG. 6. The cradle 12 and boat 14 are shown in part. A magnet 80 embedded in the cradle operates a reed switch 82 in the handset to signal when the handset 16 is in position for hands-free operation. A microprocessor 84 has inputs connected to the switch 82 and to the handset connector 40. Outputs of the microprocessor are a transmission control signal coupled to an antenna selector switch 86, and an audio control signal coupled to audio switches 88 and 90. A transmit/receive/audio circuit 92 is coupled to the antenna selector switch 86 and to the audio switches 88 and 90. The switch 88 is connected to an earpiece 94 in the handset and via the cord 38 to an external speaker 95 coupled to the base 58. The switch 90 is connected to a microphone 98 in the handset 16 and to an external microphone 100 via the cord 38. The antenna selector switch 86 is connected to the handset antenna 24 and through the cord 38 and through a 3 watt booster 102 to an external antenna 104. A line 106 in the cord 38 is connected to a voltage source in the base 58, to the microprocessor 84 and to a grounded resistor 108 to signal to the microprocessor whether the handset is coupled to the cord. The base 58 containing the booster unit is shown as separate from the cradle 12 but can be integrated with the cradle. Also, external speaker 95 and microphone 100 are shown as passing through base 58, but could be connected directly to handset 16.

In operation, when the cradle 12, boat 14 and handset are all nested together, the position of the handset in the cradle is sensed by the switch 82 and the connection of the handset to the cradle connector is sensed by the voltage applied via the connector 40 to the resistor 108. The microprocessor responds to that data by operating the antenna selector switch 86 to enable the booster 102 and antenna 104, and to operate the switches 88 and 90 to couple the audio signals to the external speaker 95 and the external microphone 100 for hands-free operation. When the handset/boat combination are removed from the cradle 12, the switch 82 is operated causing the switches 88 and 90 to enable the internal earpiece 94 and microphone 98. On the other hand, when only the handset is removed and the boat remains in the cradle, the connector coupling is broken and the signal at the resistor 108 goes to ground causing operation of switches 86, 88 and 90 for portable operation.

It will thus be seen that the integrated telephone affords easy transfer from one mode to another without awkward plugging and unplugging of the cord to the handset, and the components are secure and compactly stored when hand-held operation is not in use. In particular, the connector 40 and receptacle 25 are readily coupled and uncoupled by placing the handset into the boat or removing it, all without special manipulation.

What is claimed is:

1. A telephone for portable wireless handset use and alternate use connected to a base station comprising:

a handset having first radio means for low power wireless communication and contacts for wired communication;

a base station having second radio means for high power wireless communication, and a cord for coupling to the handset;

a docking cradle;

a boat for removably seating in the docking cradle for hand-held operation when removed and having a pocket for receiving the handset; and the boat having terminals connected to the cord for coupling to the handset contacts for wired communication when the handset is seated in the boat;

whereby the handset can be used alone for communication via the first radio means and alternatively the handset can be mated to the boat for coupling through the cord to the base station for either hand-held or hand-free communication via the second radio means.

2. The invention as defined in claim 1 wherein the boat is a shell which closely conforms to the handset for securely receiving the handset for ease of handling in combination with the handset when removed from the docking cradle.

3. The invention as defined in claim 1 wherein the docking cradle has a cavity conforming to the outer shape of the boat for securely receiving the boat, and includes means for facilitating removal of the handset and boat from the cavity.

4. The invention as defined in claim 3 wherein the pocket of the boat conforms to the outer shape of the handset for securely receiving the handset whereby when assembled the handset, boat, and cradle are integrated into a compact unit.

5. The invention as defined in claim 1 wherein:

the boat has first latching means for securely holding the handset and first spring release means for releasing the handset from the boat; and the docking cradle has second latching means for securely holding the boat and second spring release means for releasing the boat and handset together from the cradle.

6. The invention as defined in claim 1 wherein:

a speaker and a first microphone are connected to the handset;

an earpiece and a second microphone are within the handset; and means responsive to the position of the handset relative to the cradle for enabling the speaker and the first microphone when the handset is installed on the cradle for hands-free operation, and for enabling the earpiece and the second microphone when the handset is removed from the cradle for hand-held operation.

7. The invention as defined in claim 1 including:

means responsive to the position of the handset relative to the boat for enabling the first radio means when the handset is removed from the boat and for enabling the second radio means when the handset is installed in the boat.

8. The invention as defined in claim 1 wherein the docking cradle includes cord storage means for paying out cord when the boat is being removed from the docking cradle, and for receiving cord when the boat is returned to the docking cradle.

9. The invention as defined in claim 1 wherein the terminals extend through a wall of the boat and into the pocket for conductive connection to the handset contacts.

* * * * *